US011446961B2

(12) United States Patent
Lo

(10) Patent No.: US 11,446,961 B2
(45) Date of Patent: Sep. 20, 2022

(54) TIRE PATTERN STRUCTURE

(71) Applicant: CHENG SHIN RUBBER IND. CO., LTD., Chang-Hwa (TW)

(72) Inventor: Tsai Jen Lo, Chang-Hwa (TW)

(73) Assignee: Cheng Shin Rubber Industrial Co., Ltd., Tasuen (TW)

( * ) Notice: Subject to any disclaimer, the term of this patent is extended or adjusted under 35 U.S.C. 154(b) by 951 days.

(21) Appl. No.: 16/154,969

(22) Filed: Oct. 9, 2018

(65) Prior Publication Data

US 2019/0366776 A1  Dec. 5, 2019

(30) Foreign Application Priority Data

Jun. 5, 2018 (TW) ................. 107119239

(51) Int. Cl.
| | |
|---|---|
| *B60C 11/01* | (2006.01) |
| *B60C 11/11* | (2006.01) |
| *B60C 13/02* | (2006.01) |
| *B60C 11/03* | (2006.01) |
| B60C 11/12 | (2006.01) |

(52) U.S. Cl.
CPC ............. *B60C 11/11* (2013.01); *B60C 11/01* (2013.01); *B60C 11/0302* (2013.01); *B60C 11/033* (2013.01); *B60C 11/0304* (2013.01); *B60C 11/0306* (2013.01); *B60C 13/02* (2013.01); *B60C 2011/0372* (2013.01); *B60C 2011/1254* (2013.01)

(58) Field of Classification Search
CPC ... B60C 11/01; B60C 11/0302; B60C 11/033; B60C 13/02; B60C 2011/0372; B60C 2011/1254

USPC ............. D12/536, 544, 548, 564, 566
See application file for complete search history.

(56) References Cited

U.S. PATENT DOCUMENTS

| | | | | |
|---|---|---|---|---|
| 6,533,007 B1 | * | 3/2003 | McMannis | ............. B60C 11/01 |
| | | | | 152/209.16 |
| D512,369 S | * | 12/2005 | Lo | ........................... B60C 11/01 |
| | | | | D12/548 |

FOREIGN PATENT DOCUMENTS

GB            1602723 A   * 11/1981

* cited by examiner

*Primary Examiner* — Steven D Maki
(74) *Attorney, Agent, or Firm* — Rosenberg, Klein & Lee

(57) ABSTRACT

A tire pattern structure including a tread pattern and a sidewall pattern is formed by uniformly distributed patterns in the circumferential direction of a tire. The tread pattern is formed by two long spoon-shaped pattern blocks symmetrical with respect to the center of the tire tread and the axial direction of the tire. A spoon-shaped pattern block group is across the center of the tire tread and each interlaced and mapped sideway along the center of the tire tread formed by upper and lower long spoon-shaped pattern block groups. The two spoon-shaped patterns are coupled from a head block to a handle block and bent at the tire shoulder to couple the sidewall pattern formed by the upper and lower sidewall pattern blocks which are formed by a quadrilateral block of two protrusions and three recessed blocks to overcome rough terrains and provide excellent mud and water removing performance.

13 Claims, 5 Drawing Sheets

TIRE PATTERN STRUCTURE

FIELD OF THE INVENTION

The present invention relates to a tire pattern structure and more particularly to a design of the tire pattern structure capable of improving the performance of grip and mud/water removal, and the handling and climbing abilities of a motor vehicle.

BACKGROUND OF THE INVENTION

Tires are generally used on motor vehicles driven on a road, but the road construction of some countries or districts may not reach our desired destination. Furthermore, the road surface of a road may be damaged due to bad climates, heavy rain, and wet conditions or submerged by mudslides. Since the tire is in direct contact with the ground, therefore the tire must be able to drain water and remove mud when a motor vehicle is driven in a bad terrain such as shallow sandy land, wet sandy land, deep muddy land, dry sandy land, high different-level mudstony land, or even requires wading. A tire pattern with excellent performance of removing mud and water and climbing muddy/rocky land is required to overcome the rough terrain, so as to improve the handling of the motor vehicle during driving effectively.

A tire for the use on non-ordinary roads is used for motor vehicles driving in areas other than the roads which are called "off-the-road (OTR)" areas, and these areas include construction sites, factories, mining areas, jungles, forests, deserts, river beds, beaches, etc. To allow the motor vehicle to be driven on the muddy, slippery, and soft terrains, the pattern of the tire providing good handling to the motor vehicle, good performance of removing water and mud from the tire, and good climbing ability to the motor vehicle relies on the arrangement of blocks and the size and shape of each block. In addition, the ratio of the area of the blocks in the whole pattern to the grounding area (which is called the "land ratio") also affects the performance of the tire.

U.S. Pat. No. 7,134,467 entitled "Low net-to-gross ratio OTR tire discloses a OTR tire comprising a plurality of blocks protruding from the center and the shoulders of a tread, wherein the blocks protruding from the center are arranged along the circumference of the tire continuously and extended and passed through the equatorial plane, and the shape and direction of each block protruding from the center are the same as other adjacent ones, and the tire has a block group with a low net-to-gross ratio, wherein the block group of the tire has a net-to-gross ratio smaller than 40%.

U.S. Pat. No. 9,783,007 entitled "Off-road pneumatic tire discloses a pneumatic tire with a high traction performance and capable of driving on an off-road surface, and the tire has a tread including a main body and a plurality of pattern blocks projecting from the main body substantially outward in radial direction, and the center block group on the equator includes the following parts" a first center pattern block and a fourth center pattern block which are formed by a single pattern block of a large pattern block; and a second center pattern block and a third center pattern block which are formed by a double pattern block of two small pattern blocks arranged parallel to each other in the axial direction, wherein the interval from the first center pattern block to the second center pattern block is greater than the interval from the second center pattern block to the third center pattern block, and smaller than the interval from the third center pattern block to the fourth center pattern block.

SUMMARY OF THE INVENTION

In the aforementioned structures, a special design of the tire pattern is provided for the use on motor vehicles driving on off-roads, and the design of the tire pattern provides larger mud removing channels to prevent the mud from being clogged, but the comfortability of driving will be dropped due to a lower land ratio. Furthermore, the pattern blocks may be deformed too much while the motor vehicle is being driven or braked since the rigidity of a single pattern block is insufficient. Therefore, the durability of the tire pattern will be affected adversely, and the tire performance will be dropped significantly. To overcome the durability of the tire pattern and the comfortability of driving on off-roads, it is necessary to design a novel tire pattern that takes every function into consideration to improve the performance of the pattern structure.

In view of the aforementioned drawbacks, the present invention provides a tire pattern structure, wherein the tire pattern is comprised of a tread pattern and a sidewall pattern, and the whole tire pattern is composed of multiple groups of tire patterns distributed uniformly on the tread and sidewall and arranged in the circumferential direction of the tire, and the tread pattern is composed of two long spoon-shaped pattern blocks symmetrically arranged with respect to the center of the tire tread and the axial direction of the tire, and the group of spoon-shaped pattern blocks are disposed across the center of the tire tread, and the spoon-shaped pattern blocks are interlaced and mapped sideway along the center of the tire tread, and each spoon-shaped pattern block group is formed by upper and lower long spoon-shaped pattern blocks, and the upper and lower spoon-shaped pattern blocks disposed at the center of the tread have the same shape and size as those of the head, and the difference resides on that the lower spoon-shaped pattern block has a handle block with a length smaller than the length of the handle block of the upper spoon-shaped pattern block, and the two spoon-shaped pattern blocks are bent at the tire shoulder to the sidewall to couple the a sidewall pattern formed by the upper and lower sidewall pattern blocks in a stairway form, wherein the upper and lower sidewall pattern blocks include a quadrilateral block of two protrusions, and the quadrilateral block of the first protrusion has an end coupled to the tread pattern block by the first and second recessed blocks and the other end coupled to an end of the quadrilateral block of the second protrusion by the central recessed block, and the other end of the quadrilateral block of the second protrusion is coupled to the sidewall by a gradually inclined arc recessed block.

In the arrangement and configuration of the whole pattern, the tread pattern has a width TW equal to 40~50% of the total width W of the tire pattern, and the spoon-shaped pattern block includes a head block and a handle block, and the sidewall pattern has a width DW equal to 40~60% of the width of the spoon-shaped pattern block, and the head block includes a bridge recessed pattern with a width BW equal to 5~15% of the width TW of the tread pattern, and the center of the head block has two parallel slots, and the center of the handle block has a slot, and the slot of the head block has a length AW equal to 30~60% of the length CW of the slot of the handle block, and the sidewall pattern has a width DW equal to 80~120% of the width of adjacent groove EW, and the whole tread pattern has a groove depth A (measured at a position of the center line CL of the tire) equal to 50~80% of the groove depth B (measured at a position of the center line CL of the tire and halfway from the shoulder), and 200~400% of the groove depth B of the step difference C, and the spoon-shaped pattern block has a head pattern arranged at an pattern angle A of 5°~15°, an angle B of 0°~5°, an angle C of 5°~20°, an angle D of 20°~40°, an angle E of 85°~95°, an angle F of 10°~30°, an angle G of 5°~25°, an angle H of 0°~15°, an angle I of 0°~15°, and a round corner R of 100~1500 mm.

The ranges of these angles provide the best effect. If the angle is too small, the forward resistance will be large, particularly for the sandy land. If the angle is too large, then the effect of removing mud will be reduced.

In another configuration of the sidewall pattern, the recessed block of the sidewall pattern has a length YW equal to 15~35% of the width SW of the sidewall pattern, and the protrusion block in the sidewall pattern has a length ZW equal to 15~35% of the width SW of the sidewall pattern, and the protrusion block in the sidewall pattern has a length ZW equal to 90~110% of the length YW of the recessed block, and the tread pattern and the sidewall pattern coupled to the recessed pattern at the shoulder has a long step difference LD equal to 120~150% of a short step difference SD, and the first protrusion block of the sidewall pattern arranged in the axial direction of the tire has a width W2 equal to 110~130% of the width W1 of the second recessed pattern arranged in the axial direction of the tire, and the central recessed block arranged in the axial direction of the tire has a width W3 equal to 90~98% of the width W1 of the second recessed pattern arranged in the axial direction of the tire, and the second protrusion block arranged in the axial direction of the tire has a width W4 equal to 105~120% of the width W1 of the second recessed pattern arranged in the axial direction of the tire.

Compared with the prior art, the present invention provides a tire pattern structure with a spoon-shaped block warped in a direction from the handle block towards the center of the tread, so that the direction of removing mud is always in a backward direction, so as to improve the ability of moving forward on a muddy land. The spoon-shaped pattern blocks are interlaced in a V-shape to facilitate extra mud or water to be removed from both sides. The quantity of mud carried by the tire in a U-turn is increased, so that the tire can be moved easily on the sandy land. In addition, the water removing function of the tire is enhanced, so that a motor vehicle can reduce the forward resistance when wading in water.

Another objective of the present invention is to provide a tire pattern structure with a slot between the tread patterns to adjust the elasticity of the pattern block and improve the rigidity of the pattern block.

A further objective of the present invention is to provide a tire pattern structure having shoulders disposed on both sides and bent to the sidewall pattern, and the design with a vertical step difference of the block of the sidewall pattern and a sideway interlace and mapping can improve the climbing ability of the tire.

Another objective of the present invention is to provide a tire pattern structure with a bridge between the spoon-shaped pattern blocks for forming the connection between the groove, and such arrangement not just strengthens the rigidity of the block only, but also removes the mud in a specific direction to reduce the uncertainty of splashing.

DESCRIPTION OF THE PREFERRED EMBODIMENTS

Figure 1:
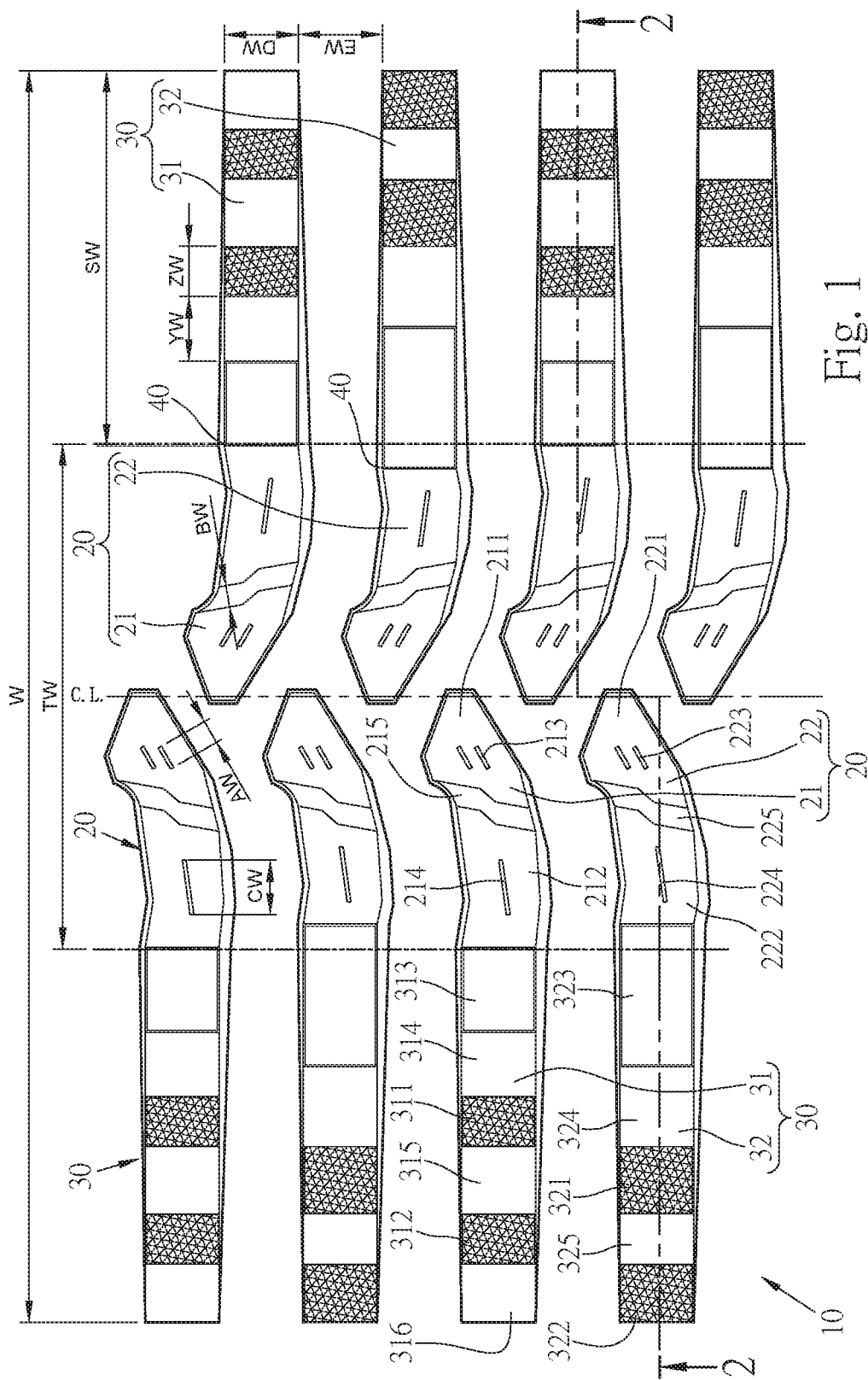
FIG. 1 is an developed view of a tire pattern structure in accordance with a preferred embodiment of the present invention.

The technical characteristics, contents, advantages and effects of the present invention will be apparent with the detailed description of a preferred embodiment accompanied with related drawings as follows. The drawings are provided for the illustration, and same numerals are used to represent respective elements in the preferred embodiments. It is intended that the embodiments and drawings disclosed herein are to be considered illustrative rather than restrictive. Same numerals are used for representing same respective elements in the drawings.

Figure 2:
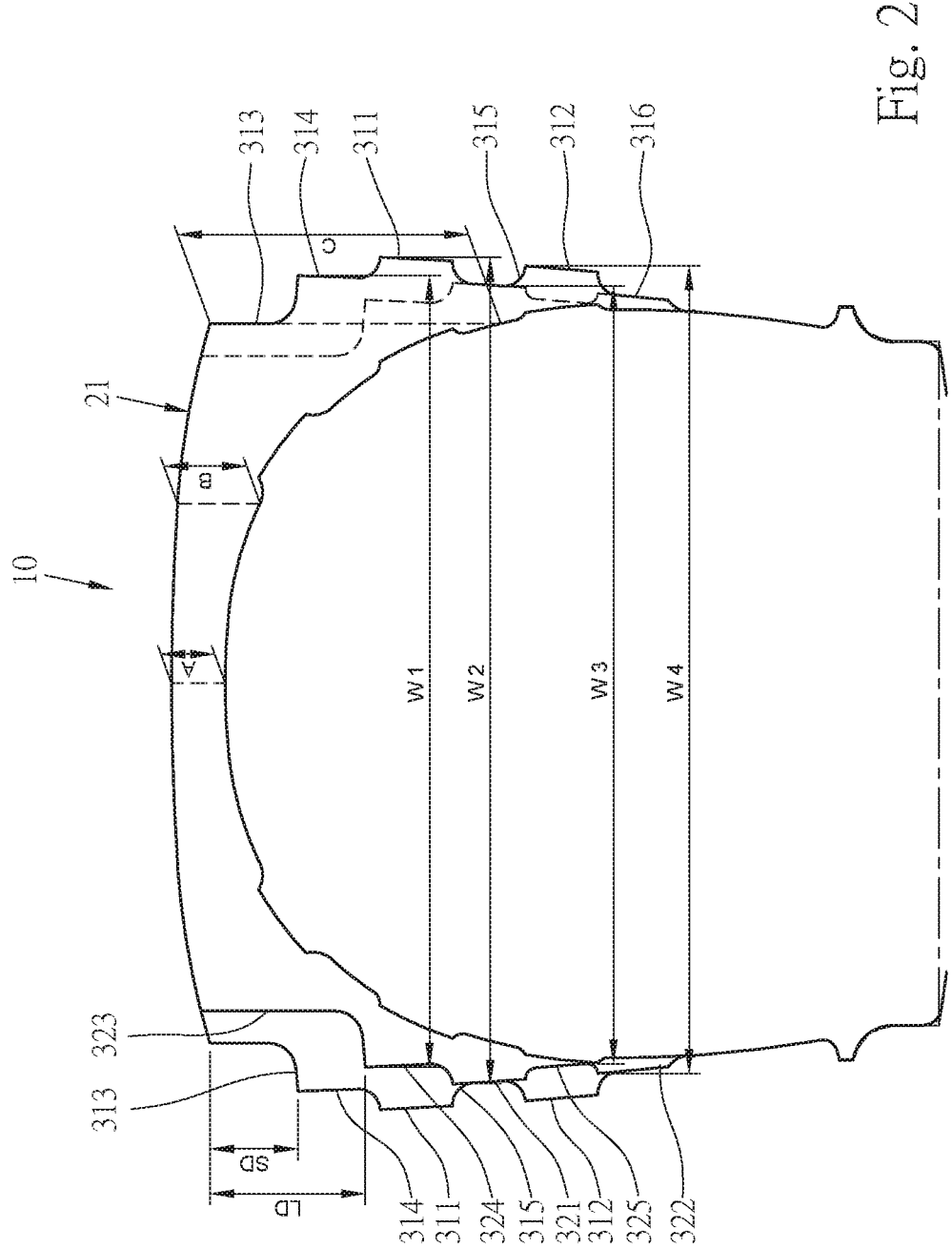
FIG. 2 is a cross-sectional view of a tire pattern structure in accordance with a preferred embodiment of the present invention.
Figure 3:
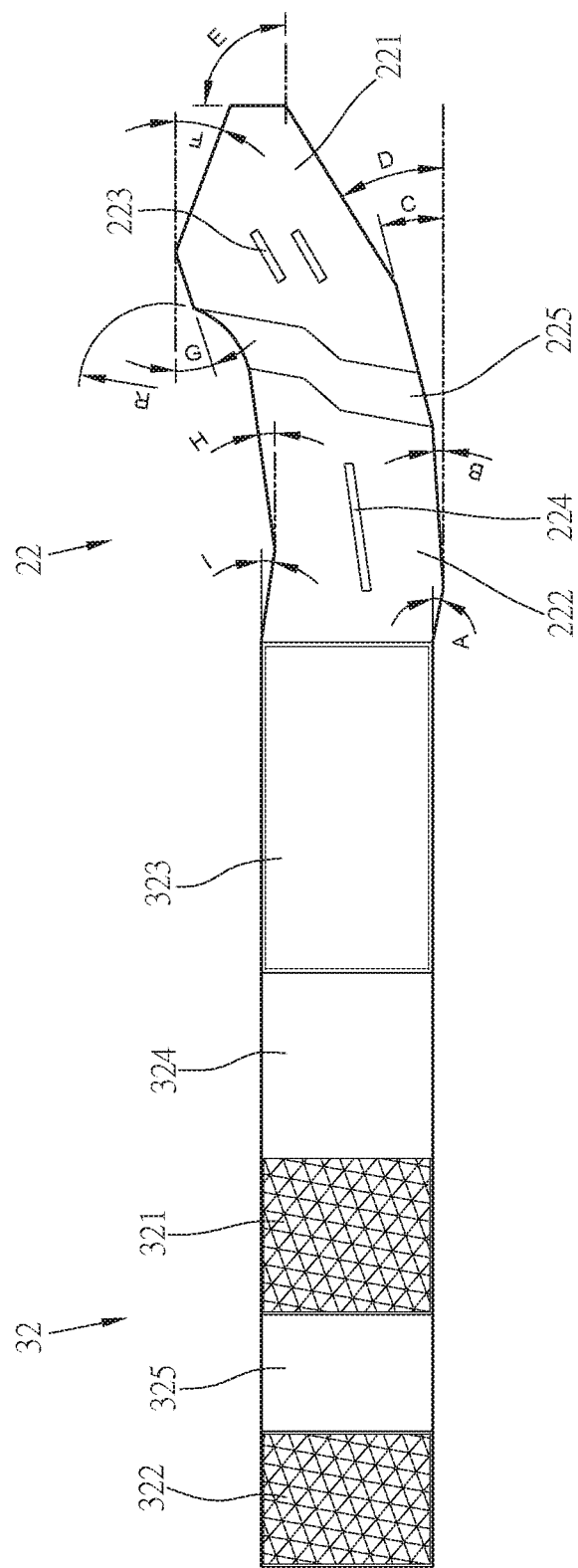
FIG. 3 is a partial enlarged view of a tire pattern structure in accordance with a preferred embodiment of the present invention.
Figure 4:
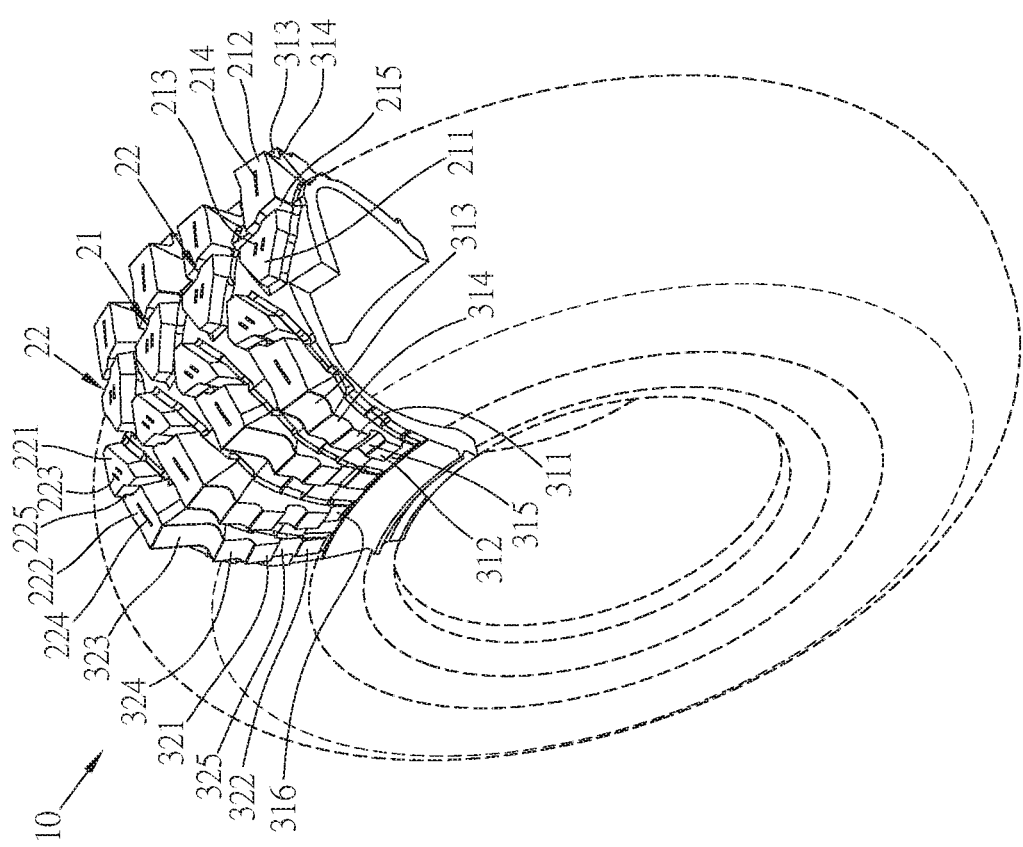
FIG. 4 is a partial perspective view of a tire pattern structure in accordance with a preferred embodiment of the present invention.
Figure 5:
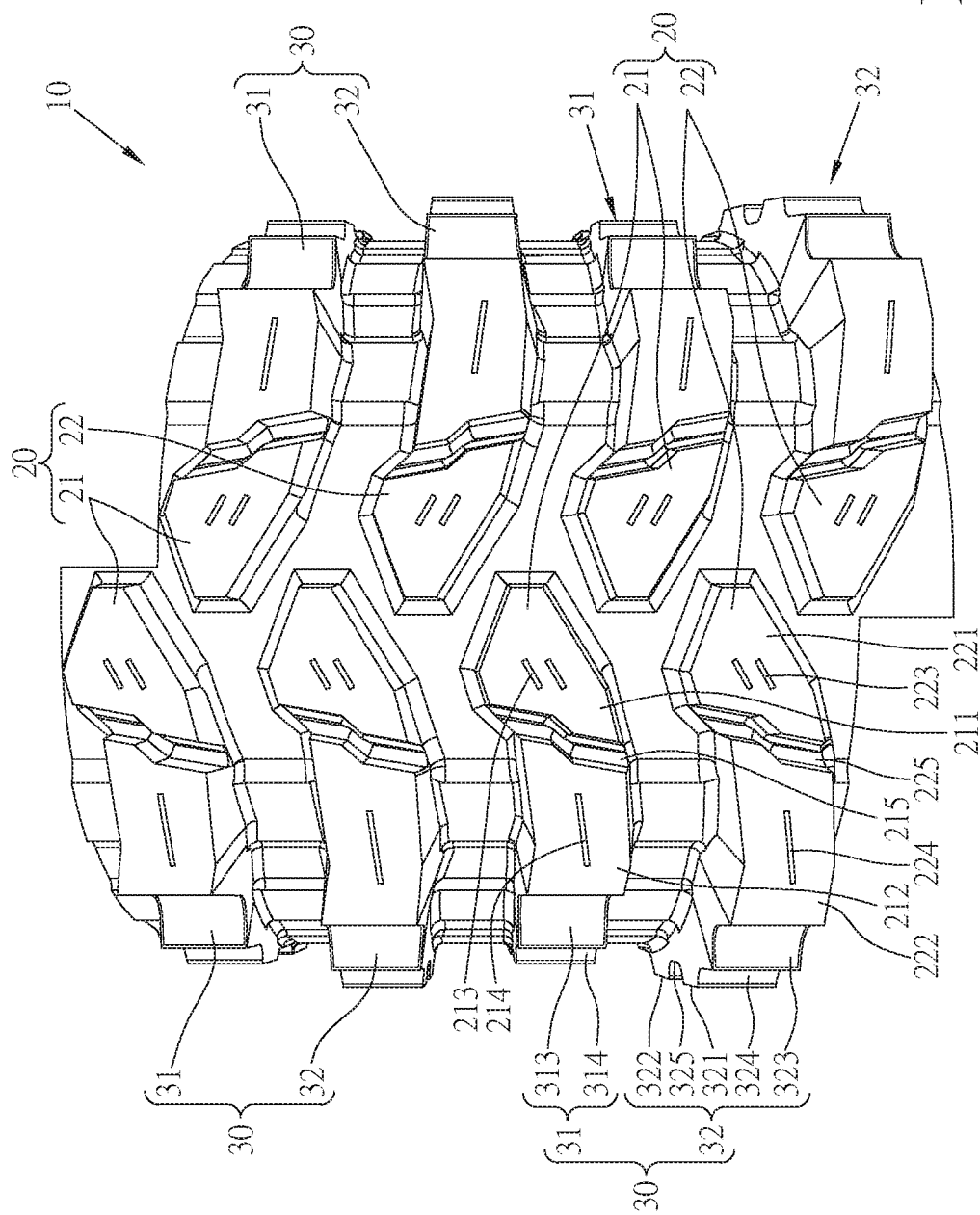
FIG. 5 is a partial front view of a tire pattern structure in accordance with a preferred embodiment of the present invention.

With reference to FIGS. 1 to 3 for a tire pattern structure of the present invention, the tire pattern (10) comprises a tread pattern (20) and a sidewall pattern (30), and the tire pattern (10) is formed by arranging and combining a plurality of uniformly distributed patterns along the circumferential direction of the tire, characterized in that the tread pattern (20) is formed by an upper spoon-shaped pattern (21) and a lower spoon-shaped pattern (22) along the center of the tire tread and with respect to the axial direction of a tire, and the long spoon-shaped pattern block group is across the center of the tire tread, and each spoon-shaped pattern block group is interlaced and mapped sideway along the center of the tire tread, wherein each spoon-shaped pattern block group is formed by an upper spoon-shaped pattern (21) and a lower spoon-shaped pattern (22), and the two spoon-shaped pattern blocks at the center of the tread have a head block (211) (221) of the same shape, and the lower spoon-shaped pattern (22) has a handle block (222) with a length smaller than the length of the handle block (212) of the upper spoon-shaped pattern (21), and the upper spoon-shaped pattern (21) and the lower spoon-shaped pattern (22) are bent at the tire shoulder (40) to the sidewall to couple a sidewall pattern (30) formed by the upper and lower sidewall pattern blocks (31), (32), and both of the upper sidewall pattern (31) and lower sidewall pattern (32) formed by a quadrilateral block of two protrusions, and the upper sidewall pattern (31) has an end coupled from a first protrusion (311) to the tread pattern (20) by a first recessed block (313) and a second recessed block (314) and the other end coupled to an end of a second protrusion block (312) by a center recession block (315), and the other end of the second protrusion block (312) is coupled to the sidewall by a gradually inclined arc recession block (316) and another lower sidewall pattern (32) has an end coupled from a first protrusion (321) to the tread pattern (20) by a first recession block (323) and a second recession block (324) and the other end coupled to an end of a second protrusion block (322) by a center recession block (325).

In the tire pattern (10) of the present invention as shown in FIG. 1, the tread pattern (20) has a width TW equal to 40~50% of the total width W of the whole tire pattern, wherein a too-small area of the tread pattern (20) may cause insufficient grip easily, and a too-large area of the tread pattern (20) may reduce the effect of removing mud easily.

In the tire pattern (10) of the present invention as shown in FIG. 1, each recession of the sidewall pattern (30) includes a first recession (313) (323), a second recession (314) (324), a center recession (315) (325) and an arc recession (316), and each recession has a width equal to 20~50% of the total width SW [(W−TW)/2] of the sidewall pattern (30), and the portion left by deducting each recession from the sidewall pattern (30) is equal to 15~35% of the total width SW of the first protrusion (311) (321) and the second protrusion (312) (322). If the width of the recession is too large, the protection of the sidewall will be poor. If the width of the recession is too large, the tire will be heavy.

In FIG. 1, the area of the front bridge is equal to 20~50% of the spoon-shaped pattern block, and the area of the rear bridge (which is the area of the handle block) is equal to 30~50% of the spoon-shaped pattern block, and the width BW of the bridge (215) (225) is equal to 5%-15% of the total width TW. A too-small width may cause a poor effect of removing mud and water, and a too-large width may affect the effect of handling.

In FIG. 1, the tread pattern (20) comprises a head block (211) (221) and a handle block (212) (222), and the middle of the head block (211) (221) has two parallel head block slots (213) (223), and the middle of the handle block (212) (222) has a handle block slot (214) (224), wherein the head block slot (213) (223) has a length AW equal to 30~60% of the length CW of the handle block slot (214) (224), so as to adjust the elasticity of the pattern block and improve the rigidity.

In FIG. 1, the sidewall pattern (30) has a width DW, the width DW of the sidewall pattern (30) is 80~120% of the adjacent groove width EW. A too-small width will affect the anti-piercing ability, and a too-large width will result in a heavy tire. In FIG. 2, both of the tread pattern (20) and the sidewall pattern (30) are coupled to at the shoulder (40), wherein the long step difference LD of the first recession pattern (323) of the lower sidewall pattern (32) is equal to 120~150% of the short step difference SD of the first recession pattern (313) of the upper sidewall pattern (31). The design with these two step differences can improve the climbing ability of the tire.

With reference to FIG. 2 for a cross-sectional view of a tire pattern (10) in accordance with the present invention, the center position of the tread has a groove depth A, and the mid-point position between the center of the tire and the shoulder has a groove depth B, wherein the groove depth A of the tread pattern (20) is equal to 50~80% of the groove depth B, and the step difference C is equal to 200~400% of the groove depth B, and the vertical step difference with respect to the height of the sidewall pattern block and the sideway interlaced mapping design can improve the climbing ability of the tire, practically good for climbing rocky land.

In FIG. 2, the first protrusion block pattern (321) of the sidewall pattern (30) has a width W2 in the axial direction of the tire is equal to 110~130% of the width W1 of the second recession block pattern (324) in the axial direction of the tire, and the center recession block pattern (325) has a width W3 in the axial direction of the tire equal to 90~98% of the width W1 of the second recession block pattern (324) in the axial direction of the tire, and the second protrusion block pattern (322) has a width W4 in the axial direction of the tire equal to 105~120% of the width W1 of the second recession block pattern (324) in the axial direction of the tire, and each width is formed into a stairway form, so as to provide a good anti-piercing effect.

With reference to FIG. 3 for the enlarged view of a lower spoon-shaped pattern (22) in accordance with the present invention, the tread pattern (20) has a spoon pattern (212) configured with an angle A of 5°~15°, an angle B of 0°~5°, an angle C of 5°~20°, an angle D of 20°~40°, an angle E of 85°~95°, an angle F of 10°~30°, an angle G of 5°~25°, an angle H of 0°~15°, an angle I of 0°~15°, and a round corner R of 100~1500 mm, and the ranges of these angles give the best effect. If the angle is smaller than the predetermined value, then the forward resistance will be too large, particularly in the sandy land. If the angle is larger than the predetermined value, then the effect of removing mud will be reduced.

In summation of the description above, the tire pattern structure of the present invention is reasonably configured with the pattern block of the tire pattern and their related mud removing channel, and comprised of the tread pattern and the sidewall pattern, and alternatively arranged along the circumferential direction and the axial direction of the tire sequentially to improve the handling and climbing ability significantly and also enhance the rigidity and support of the tire while improving the safety and service life. The invention provides a useful off-the-road tire.

What is claimed is:

1. A tire, comprising:
   a tread, the tread including a tread pattern;
   two shoulders; and
   two sidewalls, each sidewall of the two sidewalls including a group of sidewall patterns, and each group of sidewall patterns including an upper sidewall pattern and a lower sidewall pattern spaced from each other relative to a circumferential direction of the tire and extending transversely with respect to the circumferential direction of the tire, each upper sidewall pattern of the two sidewalls includes two sidewall pattern blocks, and each lower sidewall pattern of the two sidewalls includes two sidewall pattern blocks, wherein each of the sidewall pattern blocks of each of the upper and lower sidewall patterns is thereby alternatively disposed in spaced-circumferential relationship;
   wherein the tread pattern and the group of sidewall patterns of each sidewall together define a tire pattern formed by a plurality of uniformly distributed patterns arranged in the circumferential direction of the tire, the tread pattern being formed by groups of long spoon-shaped patterns, and each group of long spoon-shaped patterns includes an upper long spoon-shaped pattern and a circumferential-spaced lower long spoon-shaped pattern respectively extending in an axial direction of the tire, wherein each of the upper long spoon-shaped pattern and each of the lower long spoon-shaped pattern respectively include two spoon-shaped pattern blocks extending axially in opposing directions from a central portion of the tread pattern and symmetrically arranged with respect to the central portion of the tread pattern, each of the spoon-shaped pattern blocks thereby being alternatively disposed in spaced-circumferential relationship, and each spoon-shaped pattern block of each of the upper and lower long spoon-shaped patterns includes a head block coupled to a handle block, wherein a length of the handle blocks of the spoon-shaped pattern blocks of the lower spoon-shaped pattern is smaller than a length of the handle blocks of the spoon-shaped pattern blocks of the upper spoon-shaped pattern, each of the two spoon-shaped pattern blocks of each of the upper and lower long spoon-shaped patterns being coupled to the respective sidewall pattern block of the corresponding upper and lower sidewall pattern, and each of the two spoon-shaped pattern blocks of each of the upper and lower long spoon-shaped patterns extend angularly with respect to the axial direction of the tire in a series of segments of progressively-increasing angles from a corresponding portion of the respective tire shoulder, and each of the sidewall pattern blocks of the upper and lower sidewall patterns include respective quadrilateral blocks having first and second protrusions, and also include a central recessed block, a first recessed block, and a second recessed block, and the quadrilateral block having the first protrusion of the sidewall pattern blocks of each of the upper and lower sidewall patterns has a first end coupled to a corresponding portion of the tread pattern by both of respective first and second recessed blocks, and the quadrilateral block having the first protrusion of the sidewall pattern blocks of each of the upper and lower sidewall patterns has a second end coupled to a first end of a corresponding quadrilateral block having the second protrusion by the respective central recessed block, the sidewall pattern blocks of the upper sidewall pattern also include a gradually inclined arc recessed block, and a second end of the quadrilateral block having the second protrusion of the sidewall pattern blocks of the upper sidewall pattern is coupled to a corresponding portion of the sidewall by the respective gradually inclined arc recessed block; and wherein a center of the head block of each spoon-shaped pattern block of each of the upper and lower long spoon-shaped patterns has two parallel slots, and a center of the handle block of each spoon-shaped pattern block of each of the upper and lower long spoon-shaped patterns has a slot, and the slots of the head block have a length AW equal to 30~60% of a length CW of the slot of the handle block.

2. The tire pattern structure of claim 1, wherein a width TW of the tread pattern is equal to 40~50% of a width W of the tire pattern.

3. The tire pattern structure of claim 1, wherein a length YW of the second recessed block of each of the sidewall pattern blocks of the upper and lower sidewall patterns in a direction transverse to the circumferential direction is equal to 15~35% of a width SW of a corresponding sidewall pattern block in the direction transverse to the circumferential direction, and a length ZW of the quadrilateral blocks having the first and second protrusions of each of the sidewall pattern blocks of the upper and lower sidewall patterns in the direction transverse to the circumferential direction is equal to 15~35% of the width SW.

4. The tire pattern structure of claim 3, wherein the length YW is equal to 90~110% of the length ZW.

5. The tire pattern structure of claim 1, wherein a width DW of each of the sidewall pattern blocks of the upper and lower sidewall patterns in the circumferential direction is equal to 40~60% of a width of a corresponding spoon-shaped pattern block in a direction transverse to the circumferential direction.

6. The tire pattern structure of claim 5, wherein each spoon-shaped pattern block of each of the upper and lower long spoon-shaped patterns has formed thereon a bridge recessed pattern including a bridge connecting the corresponding head block with the corresponding handle block, and a width BW of the bridge recessed pattern in the direction transverse to the circumferential direction is equal to 5~15% of a width TW of the tread pattern.

7. The tire pattern structure of claim 5, wherein the width DW is equal to 80~120% of a distance EW between corresponding adjacent sidewall pattern blocks of the upper and lower sidewall patterns in the circumferential direction.

8. The tire pattern structure of claim 1, wherein a tread depth A is defined at a center position of the tread pattern, and a tread depth B is defined at mid-point positions between the center of the tire and the shoulders, and the tread depth A is equal to 50~80% of the tread depth B, and a shoulder depth C is defined at the respective shoulders, and the shoulder depth C is equal to 200~400% of the tread depth B.

9. The tire pattern structure of claim 1, wherein the first recessed block of the sidewall pattern blocks of the upper sidewall pattern has a length SD, and the first recessed block of the sidewall pattern blocks of the lower sidewall has a length LD, and the length LD is equal to 120~150% of the length SD.

10. The tire pattern structure of claim 1, wherein a width W1 is the distance between the second recessed block of one of the sidewall pattern blocks and the second recessed block of another one of the sidewall pattern blocks of the lower sidewall pattern in a direction transverse to the circumferential direction, a width W2 is the distance between the quadrilateral block having the first protrusion of one of the sidewall pattern blocks and the quadrilateral block having the first protrusion of another one of the sidewall pattern blocks of the lower sidewall pattern in the direction transverse to the circumferential direction, a width W3 is the distance between the central recessed block of one of the sidewall pattern blocks and the central recessed block of another one of the sidewall pattern blocks of the lower sidewall pattern in the direction transverse to the circumferential direction, a width W4 is the distance between the quadrilateral block having the second protrusion of one of the sidewall pattern blocks and the quadrilateral block having the second protrusion of another one of the sidewall pattern blocks of the lower sidewall pattern in the direction transverse to the circumferential direction, wherein the width W2 is equal to 110~130% of the width W1, wherein the width W3 is equal to 90~98% of the width W1, wherein the width W4 is equal to 105~120% of the width W1.

11. The tire pattern structure of claim 1, wherein an area of the tread pattern in the circumferential direction is equal to 25~40% of the total area of the tire pattern in the circumferential direction, and an area of the head block of each spoon-shaped pattern block of each of the upper and lower long spoon-shaped patterns in the circumferential direction is equal to 20~50% of an area of the corresponding spoon-shaped pattern block, and an area of the handle block of each spoon-shaped pattern block of each of the upper and lower long spoon-shaped patterns in the circumferential direction is equal to 30~50% of the area of the corresponding spoon-shaped pattern block.

12. The tire pattern structure of claim 1, wherein each spoon-shaped pattern block of each of the upper and lower long spoon-shaped patterns has formed thereon a bridge recessed pattern including a bridge connecting the corresponding head block with the corresponding handle block, wherein the sidewall pattern blocks of the upper and lower sidewalls define a first reference line in a direction transverse to the circumferential direction, and an angle A is the angle defined with respect to the first reference line at a transitioning position from the first recessed block to the handle block, an angle B is the angle defined with respect to a second reference line parallel to the first reference line at a position on the handle block prior to transitioning to the bridge recessed pattern, an angle C is the angle defined with respect to a third reference line parallel to the first reference line at a transitioning position from the handle block to the bridge recessed pattern, an angle D is the angle defined with respect to a fourth reference line parallel to the first reference line at a position subsequent to transitioning from the bridge recessed pattern to the head block, an angle E is the angle defined with respect to a fifth reference line parallel to the first reference line at a position on an end portion of the head block, an angle F is the angle defined with respect to a sixth reference line parallel to the first reference line at a position on the head block prior to transitioning to the bridge recessed pattern, an angle G is the angle defined with respect to the sixth reference line at the position on the head block prior to transitioning to the bridge recessed pattern and further defined as 180°—angle F—a predetermined interior head block angle, an angle H is the angle defined with respect to a seventh reference line parallel to the first reference line at a position subsequent to transitioning from the bridge recessed pattern to the handle block, an angle I is the angle defined with respect to an eighth reference line parallel to the first reference line at a transitioning position from the handle block to the first recessed block, and a round corner R is defined at a corner portion transitioning from the head block to the bridge recessed pattern, and wherein the angle A is 5°~15°, the angle B is 0°~5°, the angle C is 5°~20°, the angle D is 20°~40°, the angle E is 85°~95°, the angle F is 10°~30°, the angle G is 5°~25°, the angle H is 0°~15°, the angle I is 0°~15°, and the round corner R is 100~1500 mm.

13. A tire, comprising:
   a tread, the tread including a tread pattern;
   two shoulders; and
   two sidewalls, each sidewall of the two sidewalls including a group of sidewall patterns, and each group of sidewall patterns including an upper sidewall pattern and a lower sidewall pattern spaced from each other relative to a circumferential direction of the tire and extending transversely with respect to the circumferential direction of the tire, each upper sidewall pattern of the two sidewalls includes two sidewall pattern blocks, and each lower sidewall pattern of the two sidewalls includes two sidewall pattern blocks, wherein each of the sidewall pattern blocks of each of the upper and lower sidewall patterns is thereby alternatively disposed in spaced-circumferential relationship;
   wherein the tread pattern and the group of sidewall patterns of each sidewall together define a tire pattern formed by a plurality of uniformly distributed patterns arranged in the circumferential direction of the tire, the tread pattern being formed by groups of long spoon-shaped patterns, and each group of long spoon-shaped patterns includes an upper long spoon-shaped pattern and a circumferential-spaced lower long spoon-shaped pattern respectively extending in an axial direction of the tire, wherein each of the upper long spoon-shaped pattern and each of the lower long spoon-shaped pattern respectively include two spoon-shaped pattern blocks extending axially in opposing directions from a central portion of the tread pattern and symmetrically arranged with respect to the central portion of the tread pattern, each of the spoon-shaped pattern blocks thereby being alternatively disposed in spaced-circumferential relationship, and each spoon-shaped pattern block of each of the upper and lower long spoon-shaped patterns includes a head block coupled to a handle block, wherein a length of the handle blocks of the spoon-shaped pattern blocks of the lower spoon-shaped pattern is smaller than a length of the handle blocks of the spoon-shaped pattern blocks of the upper spoon-shaped pattern, each of the two spoon-shaped pattern blocks of each of the upper and lower long spoon-shaped patterns being coupled to the respective sidewall pattern block of the corresponding upper and lower sidewall pattern, and each of the two spoon-shaped pattern blocks of each of the upper and lower long spoon-shaped patterns extend angularly with respect to the axial direction of the tire in a series of segments of progressively-increasing angles from a corresponding portion of the respective tire shoulder, and each of the sidewall pattern blocks of the upper and lower sidewall patterns include respective quadrilateral blocks having first and second protrusions, and also include a central recessed block, a first recessed block, and a second recessed block, and the quadrilateral block having the first protrusion of the sidewall pattern blocks of each of the upper and lower sidewall patterns has a first end coupled to a corresponding portion of the tread pattern by both of respective first and second recessed blocks, and the quadrilateral block having the first protrusion of the sidewall pattern blocks of each of the upper and lower sidewall patterns has a second end coupled to a first end of a corresponding quadrilateral block having the second protrusion by the respective central recessed block, the sidewall pattern blocks of the upper sidewall pattern also include a gradually inclined arc recessed block, and a second end of the quadrilateral block having the second protrusion of the sidewall pattern blocks of the upper sidewall pattern is coupled to a corresponding portion of the sidewall by the respective gradually inclined arc recessed block;
   wherein each spoon-shaped pattern block of each of the upper and lower long spoon-shaped patterns has formed thereon a bridge recessed pattern including a bridge connecting the corresponding head block with the corresponding handle block; and
   wherein the sidewall pattern blocks of the upper and lower sidewalls define a first reference line in a direction transverse to the circumferential direction, and an angle A is the angle defined with respect to the first reference line at a transitioning position from the first recessed block to the handle block, an angle B is the angle defined with respect to a second reference line parallel to the first reference line at a position on the handle block prior to transitioning to the bridge recessed pattern, an angle C is the angle defined with respect to a third reference line parallel to the first reference line at a transitioning position from the handle block to the bridge recessed pattern, an angle D is the angle defined with respect to a fourth reference line parallel to the first reference line at a position subsequent to transitioning from the bridge recessed pattern to the head block, an angle E is the angle defined with respect to a fifth reference line parallel to the first reference line at a position on an end portion of the head block, an angle F is the angle defined with respect to a sixth reference line parallel to the first reference line at a position on the head block prior to transitioning to the bridge recessed pattern, an angle G is the angle defined with respect to the sixth reference line at the position on the head block prior to transitioning to the bridge recessed pattern and further defined as 180°—angle F—a predetermined interior head block angle, an angle H is the angle defined with respect to a seventh reference line parallel to the first reference line at a position subsequent to transitioning from the bridge recessed pattern to the handle block, an angle I is the angle defined with respect to an eighth reference line parallel to the first reference line at a transitioning position from the handle block to the first recessed block, and a round corner R is defined at a corner portion transitioning from the head block to the bridge recessed pattern, and wherein the angle A is 5°~15°, the angle B is 0°~5°, the angle C is 5°~20°, the angle D is 20°~40°, the angle E is 85°~95°, the angle F is 10°~30°, the angle G is 5°~25°, the angle H is 0°~15°, the angle I is 0°~15°, and the round corner R is 100~1500 mm.

\* \* \* \* \*